(12) United States Patent
Reid et al.

(10) Patent No.: US 11,414,957 B2
(45) Date of Patent: Aug. 16, 2022

(54) BALL VALVE

(71) Applicant: Halliburton Energy Services, Inc., Houston, TX (US)

(72) Inventors: Michael Adam Reid, Aberdeen (GB); Bipinkumar Omprakash Singh, Aberdeen (GB)

(73) Assignee: Halliburton Energy Services, Inc., Houston, TX (US)

( * ) Notice: Subject to any disclaimer, the term of this patent is extended or adjusted under 35 U.S.C. 154(b) by 61 days.

(21) Appl. No.: 16/762,763

(22) PCT Filed: Jul. 31, 2019

(86) PCT No.: PCT/US2019/044287
§ 371 (c)(1),
(2) Date: May 8, 2020

(87) PCT Pub. No.: WO2021/021148
PCT Pub. Date: Feb. 4, 2021

(65) Prior Publication Data
US 2022/0003076 A1 Jan. 6, 2022

(51) Int. Cl.
*E21B 34/14* (2006.01)
*F16K 5/06* (2006.01)
(Continued)

(52) U.S. Cl.
CPC ............ *E21B 34/14* (2013.01); *F16K 5/0605* (2013.01); *E21B 2200/04* (2020.05);
(Continued)

(58) Field of Classification Search
CPC .... E21B 34/14; E21B 2200/04; F16K 5/0605; F16K 5/0657; F16K 5/201; F16K 25/005
See application file for complete search history.

(56) References Cited

U.S. PATENT DOCUMENTS 3,348,805 A * 10/1967 Sanctuary ............. F16K 5/0626
251/315.05
3,371,683 A * 3/1968 Stephenson ........... F16K 5/0605
137/599.12
(Continued)

FOREIGN PATENT DOCUMENTS

| GB | 2566465 A | 3/2019 |
|---|---|---|
| KR | 20010027658 A | 4/2001 |
| NO | 20161888 A1 | 11/2016 |

OTHER PUBLICATIONS

PCT Application Serial No. PCT/US2019/044287, International Search Report, dated Apr. 28, 2020, 3 pages.
(Continued)

*Primary Examiner* — Michael R Reid
(74) *Attorney, Agent, or Firm* — Delizio, Peacock, Lewin & Guerra (57) ABSTRACT

A ball valve stopper comprising a spherical contoured body comprising a substantially inelastic first material and having a flow port. A closed face of the spherical contoured body is orthogonal with respect to the flow port and includes a spherical fluid seal area. A rotation support member is aligned orthogonally to the flow port and the fluid seal area. A material discontinuity volume is disposed behind the closed face of the spherical contoured body.

19 Claims, 8 Drawing Sheets

(51) Int. Cl.
*F16K 5/20* (2006.01)
*F16K 25/00* (2006.01)

(52) U.S. Cl.
CPC ............ *F16K 5/0657* (2013.01); *F16K 5/201* (2013.01); *F16K 25/005* (2013.01)

(56) References Cited

U.S. PATENT DOCUMENTS

| | | |
|---|---|---|
| 3,826,462 A | 7/1974 | Taylor |
| 4,289,165 A | 9/1981 | Fredd |
| 4,318,420 A | 3/1982 | Calvert |
| 2012/0318525 A1 | 12/2012 | Coghill et al. |
| 2016/0003004 A1 | 1/2016 | Inglis et al. |
| 2019/0211648 A1 | 7/2019 | Davies et al. |

OTHER PUBLICATIONS

PCT Application Serial No. PCT/US2019/044287, International Written Opinion, dated Apr. 28, 2020, 7 pages.

\* cited by examiner

BALL VALVE

TECHNICAL FIELD

The disclosure generally relates to the field of fluid flow control devices more particularly to design and implementation of ball valves.

BACKGROUND

Boreholes are drilled into subterranean formations to enable withdrawal and injection of fluids such as hydrocarbon fluids in the case of withdrawal and injection fluids in the case of injection. During drilling and production phases of hydrocarbon recovery, various procedures are performed that involve temporarily isolating fluid flows into or out of a formation such as via a wellbore fluid conduit. Such procedures may include flow control operations, completion operations, and/or intervention operations. Various types of valves, such as ball valves, may be deployed in a fluid flow control system and used during downhole operations to control the flow of fluid through one or more wellbore conduits. Ball valves generally include a valve seat for receiving a valve stopper, sometimes referred to as a ball stopper, having a through hole flow port passing therethrough. A ball valve is opened and closed in a quarter turn procedure in which the valve stopper through hole is either aligned with the fluid flow path (open position) or turned approximately 90° such that one or both closed faces of the valve stopper block fluid flow (closed position).

With the ball valve in the closed position, fluid flow is blocked by a seal formed by the seating of a closed face of the valve stopper in a valve seat. A typical valve seat may comprise a ring surface that ideally makes close contact with the corresponding ring-shaped portion of the ball shaped valve stopper. The seating is typically accomplished at least in part by seating actuation means such as spring and/or hydraulic means that push, pull, or otherwise bias the valve seat toward the valve stopper to form the seal when the valve stopper is seated in the closed position. Ball valves are primarily utilized as flow gates that either allow or prevent fluid flow. The structure of ball valves in terms of material composition and configuration of constituent components (e.g., valve stopper, valve seat) may have significant operational effects. For example, a metal-to-metal ball valve configuration utilizes metal valve seats as well as a metal valve stopper to render the sealing surfaces of the ball valve more resistant to damage by pressure transients during valve open/close transitions and chemicals and/or solid particles.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without some of these specific details. In other instances, well-known instruction instances, protocols, structures and techniques have not been shown in detail in order not to obfuscate the description.

Overview

The disclosure is directed to a ball valve and components therein for controlling the flow of a fluid, for example in a subterranean wellbore. A seal may be formed in a ball valve having a contact pressure in excess of the fluid pressure being sealed against. A ball valve includes a ball valve stopper that is spherically contoured and includes a flow port that permits fluid flow through the ball valve when the ball valve is in an open position. The ball valve stopper includes a solid and spherically contoured closed face that is seated against a valve seat to form a seal against fluid pressure when the ball valve is in a closed position. In high-pressure contexts, the force applied to the closed face may cause deformations that due to the non-uniform internal structure of the ball valve stopper causes gaps in the seal between the closed face and the valve seat. Embodiments disclosed herein include a ball valve assembly including a valve stopper rotatable about a rotation axis and comprising a closed face that is orthogonally disposed with respect to a flow port through the valve stopper. The ball valve assembly further includes a valve seat having an annular seating surface that contacts an annular sealing area on the closed face when the valve stopper is rotated to the valve closed position. The valve stopper includes a material discontinuity volume formed behind the closed face within at least a portion of a circular cross-section area of the valve stopper bounded by the annular sealing area.

Example Illustrations

Figure 1:
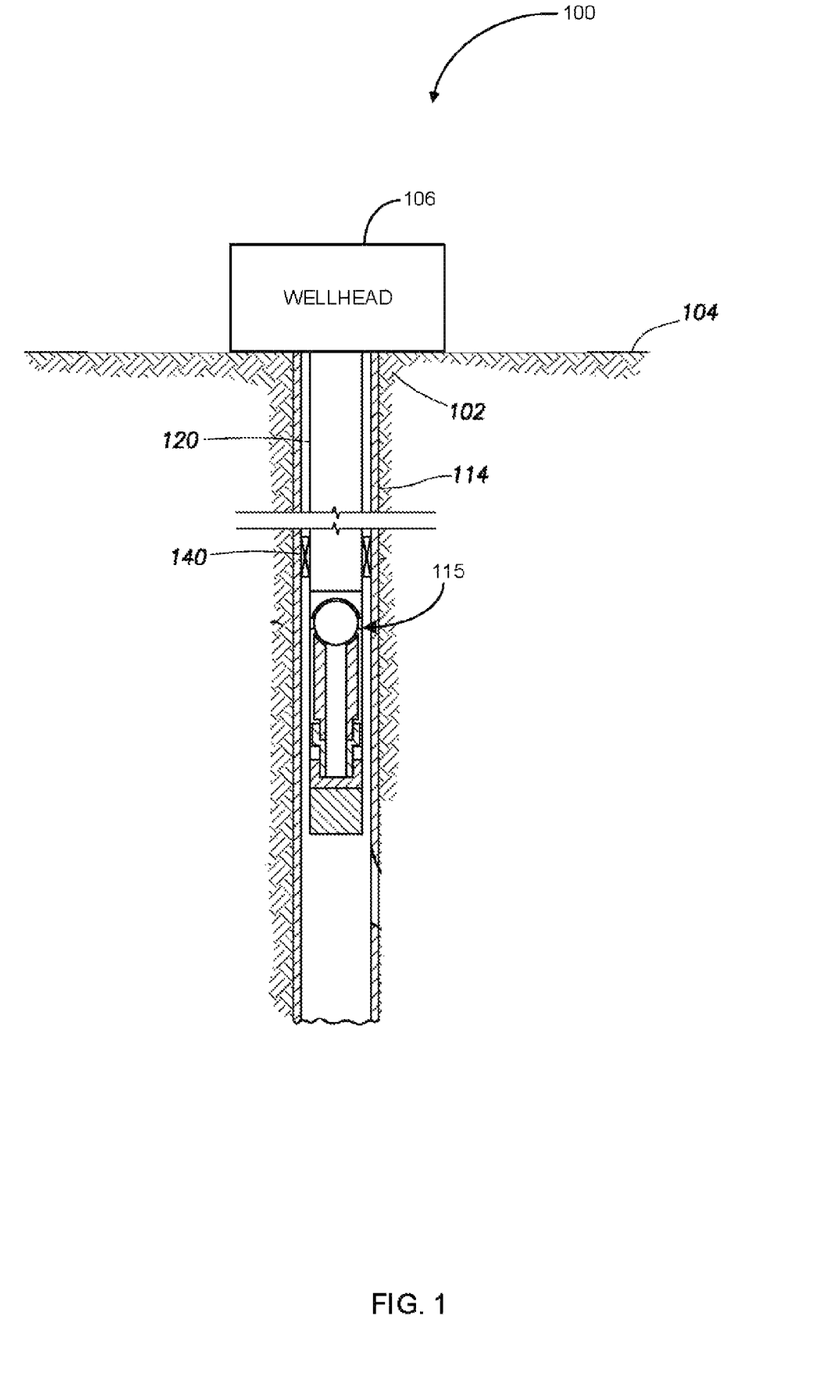
FIG. 1 is a schematic view depicting a well system that includes one or more ball valve assemblies configured in accordance with the disclosed embodiments.

FIG. 1 is a schematic view depicting a well system 100 that includes a ball valve assembly 115 configured in accordance with the disclosed embodiments. Well system 100 includes a well head 106 that is positioned on a terrain surface 104 and extends over a wellbore 114 that penetrates a subterranean formation 102 for the purpose of recovering hydrocarbons. Well system 100 further includes a wellbore tubular string 120 comprising a wellbore tubular and a ball valve assembly 115. Wellbore tubular string 120 may be lowered into wellbore 114 for a variety of production and treatment procedures throughout the life of well system 100. FIG. 1 illustrates wellbore tubular string 120 configured as a production tubing string that includes a packer 140 disposed within wellbore 114. The wellbore tubular string 120 comprising the ball valve assembly 115 is equally applicable to any type of wellbore tubular string installed within wellbore 114 and utilized for procedures requiring fluid isolation from above or below ball valve assembly 115. Example categories of wellbore tubular strings in which ball valve assembly 115 may be installed include production and injection tubing, drill pipe, casing, rod strings, and coiled tubing.

Wellhead 106 comprise various drilling and/or production related components such as motors, winches and associated equipment for positioning wellbore tubular string 120 within wellbore 114 and performing various operations relating to production and injection as well as maintenance operations. Regardless of the type of operational environment in which ball valve assembly 115 is deployed, ball valve assembly 115 is configured to control the flow of fluid through a tubular or conduit, including situations in which the fluid flow source originates downstream from either side and/or both sides of ball valve assembly 115. As utilized herein "ball valve assembly" may be used interchangeably with "ball valve." A ball valve assembly such as ball valve assembly 115 includes multiple components including a valve stopper and one or more valve seats disposed between at least one downstream port (i.e., port from which fluid flow originates) and at least one upstream port (i.e., port to which fluid flows when the ball valve is open). In some embodiments, ball valve assembly 115 may include a valve body that houses the valve stopper and valve seat components.

The use of ball valve assembly 115 as disclosed herein may allow for control of the flow of a fluid into, out of, and through wellbore tubular string 120. In some embodiments, one or more ball valves such as ball valve 115 may be deployed within wellbore tubular string 120 to control the flow of fluids within various zones of wellbore 114. In order to control the flow of a fluid within wellbore 114, ball valve assembly 115 may be actuated from an open, flow through position to a closed, flow stop position and from the closed position to the open position to selectively allow or prevent fluid flow to, from, and/or within wellbore tubular string 120. While FIG. 1 depicts ball valve assembly 115 deployed in a subterranean wellbore environment, other embodiments may utilize similar ball valves assemblies for other fluid flow control applications involving substantial differential pressures across a ball valve assembly such as may occur in pipelines, refineries, chemical plants, manufacturing facilities, water treatment/storage/supply, etc.

Figure 2A:
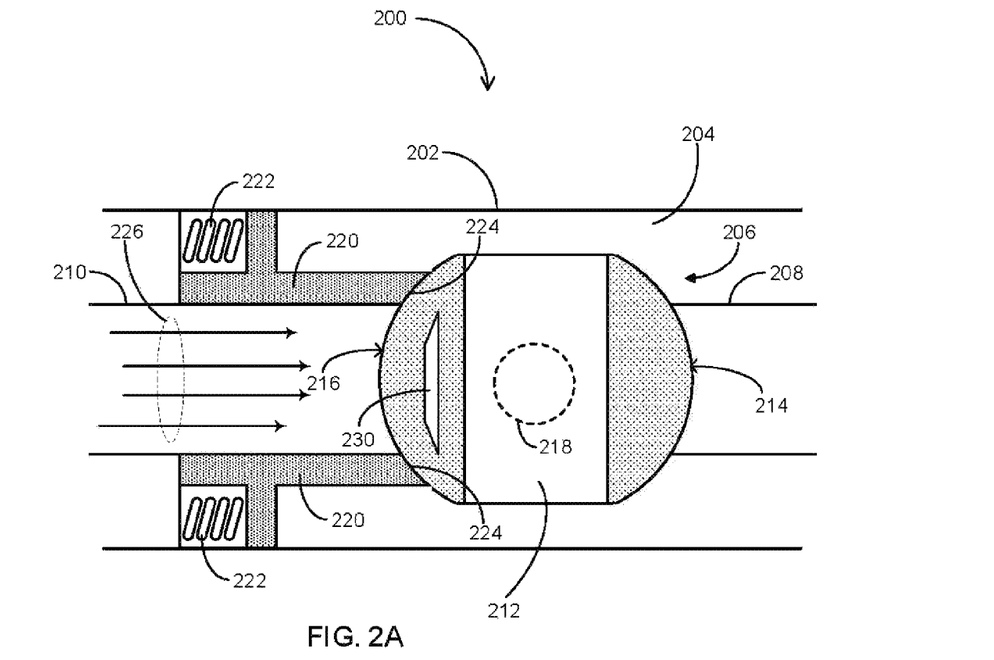
FIG. 2A is a cross-section diagram depicting implementation of a through ball valve in accordance with some embodiments.

FIG. 2A is a cross-section diagram depicting implementation of a ball valve 200 in accordance with some embodiments. Ball valve 200 comprises a valve body 202 that houses a ball-type valve stopper 206 within a cavity 204. Cavity 204 and the components contained therein are positioned between an upstream flow port 208 and a downstream flow port 210. Ball valve 200 is depicted in FIG. 2A in the valve closed position in which a closed face 214 of valve stopper 206 is facing into upstream flow port 208 and a closed face 216 is facing into downstream flow port 210. Valve stopper 206 comprises a spherical contoured body member fabricated of a relatively hard and inelastic material such as a stainless steel alloy. Orthogonal to closed faces 214 and 216, a flow port 212 is formed as a cylindrical conduit enabling fluid flow from downstream port 210 to upstream port 208 when ball valve 200 is in the valve open position with valve stopper 206 rotated by 90° from the depicted closed position. Ball valve 200 can be moved between the open and depicted closed positions by rotating valve stopper 206 about a rotation support member 218 that is aligned orthogonally to flow port 212 and closed faces 214 and 216. Rotation support member 218 may comprise an attached or integral component to valve stopper 206 and may be configured as an extending cylindrical hub that when secured within a suitable guide bearing (not depicted) provides linear position retention as well as enabling rotation of valve stopper 206.

In the depicted embodiment, ball valve 200 is a single seat valve comprising a valve seat 220 that is linearly actuated to press against the downstream closed face 216 of valve stopper 206. At the end of valve seat 220 is an annular seat surface that is depicted as the curved end surface end of valve seat 220 that contacts closed face 216. Valve seat 220 is actuated by one or more springs 222 that apply a force that pushes the annular seating surface of valve seat 220 against an annular sealing area 224 on closed face 216. The contact between the annular seating surface of valve seat 220 and the corresponding annular sealing area 224 provides a seal on closed face 216 to prevent fluid leakage. Annular sealing area 224 circumferentially bounds a spherically contoured (circular in cross-section) sealing area 225 on closed face 216. Together, annular sealing area 224 and spherical sealing area 225 comprise an overall circular/spherical fluid seal area that is bounded by the outer edge of annular sealing area 224. FIG. 2A illustrates components of ball valve 200 that directly or indirectly provide a fluid sealing function. While not depicted in FIG. 2A, ball valve 200 may also include components (e.g., a threaded connection) located above or below ball valve 200 to allow ball valve 200 to be disposed within and/or coupled to a wellbore tubular (e.g., of wellbore tubular string 120 in FIG. 1) and/or other wellbore components (e.g., production subs, downhole tools, screens, etc.), for example to form a workstring, production string, conveyance string, etc.

Figure 2B:
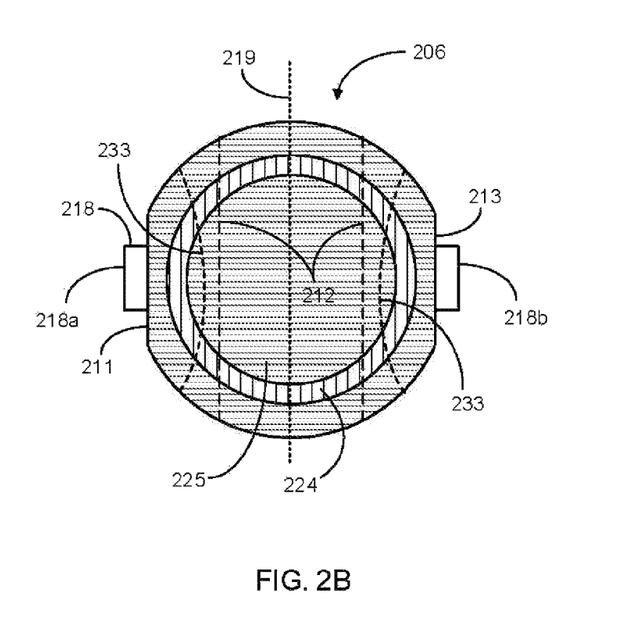
FIG. 2B is a front profile illustrating surface features of a closed face with respect to internal cross-section features of the ball valve depicted in FIG. 2A.

FIG. 2B is a front profile view illustrating surface features of closed face 216 with respect to internal cross-section features of ball valve 200 depicted as broken lines. In the depicted embodiment, valve stopper 206 is spherically contoured, comprising a truncated sphere having planar surfaces 211 and 213 on opposite sides of the sphere. Planar surfaces 211 and 213 include rotation bearings 218a and 218b, respectively, (e.g., cylindrical members) extending outwardly therefrom. Flow port 212 is depicted in broken line shadow form to depict the mutually orthogonal orientation of closed face 216 with respect to flow port 212 and rotation bearings 218a and 218b. FIG. 2B depicts the regions on closed face 216 that are exposed to pressure from hydraulic forces as well as force applied by the seat surface of valve seat 220 as linearly urged by springs 222.

Referring to FIG. 2B in conjunction with FIG. 2A, in the depicted valve closed position, substantial pressure may be applied across the portion of closed face 216 within the circumferential boundary of annular sealing area 224 that forms the overall fluid seal. The hydraulic pressure may be applied by a fluid 226 within downstream flow port 210 originating from a pressurized source (not depicted). The pressure may be a varying pressure during rotation of valve stopper 206 to close and/or open ball valve 200. With ball valve 200 in the closed position, pressure from springs 222 is applied via the seating surface of valve seat 220 to annular sealing area 224. In some embodiments, valve seat 220 may include alternate or additional linear actuation means such as a hydraulically controlled boost piston component. In such embodiments, the pressure applied by the seating surface of valve seat 220 may correspond to hydraulic pressure such as hydraulic pressure from downstream flow port 210.

The contact of the annular seating surface of valve seat 220 with annular sealing area 224 forms a ring shaped seal preventing fluid leakage at or proximate to closed face 216. Given the considerable fluid pressures that may be encountered in some applications, the contact between the seating surface of valve seat 220 and annular sealing area 224 must be relatively uniform such that there are no significant gaps in the resultant seal. Some ball valves use elastic materials such as polymers to provide closer and more uniform contact to form the seal. However, some fluid flow control applications, such as controlling flows of downhole fluids in a well system, entail environmental conditions that require harder and less elastic materials be used to form ball valve seals. For example, downhole flow control environments may include high hydraulic pressures applied from downstream that may result in pressure transients during the closing and/or opening of a ball valve that may damage softer and/or relatively elastic materials.

Metal-to-metal (m-t-m) seating may be used in which the annular seating surface of valve seat 220 and the closed surface 116 of valve stopper both comprise relatively hard and inelastic metals or metallic alloys. Such m-t-m ball valve configurations may locate the valve seat below (downstream) to avoid sealing discontinuities that may result from debris fallout that may accumulate above (upstream) a valve stopper when the ball valve is closed as depicted in FIG. 2A. However, an m-t-m ball valve such as ball valve 200 may be subject to pressure effects that may alter the surface contour of closed surface 116, resulting in contact gaps that comprise the seal between the annular seating surface of valve seat 220 and annular sealing area 224.

Within annular sealing area 224, spherical sealing area 225 provides a majority of the overall fluid sealing between downstream flow port 210 and upstream flow port 208. While the pressure gradient is relatively uniform over spherical sealing area 225, the resistance of closed surface 216 including spherical sealing area 225 and annular sealing area 224 to deformation may be compromised at least in part by non-uniformities in the internal structure of valve stopper 206 particularly relating to flow port 212. For instance, FIGS. 2A and 2B depict the internal material non-uniformity caused by flow port 212 that results in greater metallic material support nearer the support bearings 218a and 218b and lesser material support within the cross-section profile of flow port 212. Portions of spherical sealing area 225 and annular sealing area 224 may therefore be subject to greater surface deformation at materially "thinner" regions such as along or proximate to the edges of flow port 212. The deformation that would otherwise occur within spherical sealing area 225 would contributes to overall reduction in surface uniformity across closed face 216 to include annular sealing area 224, thereby creating gaps in the seal between annular sealing area 224 and the annular seating surface of valve seat 220.

To address and effectively counteract the reduced interior material support, valve stopper 206 includes a material discontinuity volume 230 as depicted in FIG. 2A. Material discontinuity volume 230 is contoured and located in a manner as to maximize uniform deformation of annular sealing area 224 by maximizing circular uniformity of the deformation of spherical sealing area 225 as well as annular sealing area 224 itself. As disclosed herein, a material discontinuity volume is essentially a volume located within the generally spherical contour of a ball valve stopper such as a volume having a contour that may be described as an open or closed hole, channel, cavity, pocket, recess, groove, etc. Material discontinuity volume 230 may comprise a volume (e.g., channel) that is either empty (e.g., a channel-contoured void) within valve stopper 206 or comprises a material having significantly different elasticity properties and/or deformation hardness as the metallic material that the main structure (e.g., closed faces) of valve stopper 206 is comprised of Based on or in addition to volume contouring and material content, the location of material discontinuity volume 230 may significantly affect the circular uniformity of deformation of regions of closed face 216 including spherical sealing area 225 and annular sealing area 224.

As depicted in FIG. 2A, material discontinuity volume 230 is disposed behind one or more portions of closed face 216 including an overall fluid seal area formed by spherical sealing area 225 and annular sealing area 224. For example, material discontinuity volume 230 may comprise a pair of open channels that run substantially parallel to the direction of flow port 212. The depth of the channel may be uniform or may vary based on proximity to materially thicker or thinner cross-section regions of valve stopper 206. In FIG. 2B for instance, a varying depth of the channel of which material discontinuity volume 230 is comprised is indicated by the contour formed by internal edges 233 of material discontinuity volume 230. As shown, the depth of the channels varies at different circumferential points based on the position of each of the points to a centerline flow axis 219 of flow port 212. In some embodiments, such as shown in FIG. 2B by the arced internal edges 233 defining the bottoms of the channels, the depth at each point of the channels increases at circumferential points around closed face 216 that are further from an axial centerline of flow port 212.

FIGS. 3-7 depict ball valve stoppers configured in accordance with some embodiments and may be utilized as ball valve stoppers for the ball valves depicted in FIGS. 1, 2A, and 2B. FIGS. 3A-3C are perspective and side profile views depicting a ball valve stopper 300 configured in accordance with some embodiments. Ball valve stopper 300 comprises a spherical contoured metallic body that includes a rotation support member 302, such as a trunnion support, that is aligned orthogonally with respect to a flow port 304. Orthogonally aligned with respect to flow port 304 and rotation support member 302 is a closed face that includes a fluid seal area 306 that is bounded by an annular sealing area 308 against which a valve seat is pushed in a ball valve assembly when the assembly is in the closed valve position. Ball valve stopper 300 further includes a material discontinuity volume in the form of a pair of open channels 310 that run substantially in parallel to the flow port 304. As shown, each of open channels 310 is positioned behind a semi-circular portion of the fluid seal area within annular sealing area 308. Each of open channels 310 is further positioned between a respective one of the diametrically opposed rotation support members 302 and at least a portion of fluid seal area 306. Open channels 310 are each straight line channels that vary in depth and consequently in cross-section area at various points based on the distance between an outer edge point of the channel (i.e., the outer circumferential point) and the centerline axis of flow port 304. In the depicted embodiment, the depth and cross-section area of channels 310 at each point along the outer circumferential edges 312 of channels 310 varies inversely with respect to a distance between each outer circumferential point and the centerline axis of the flow port.

Figure 3A:
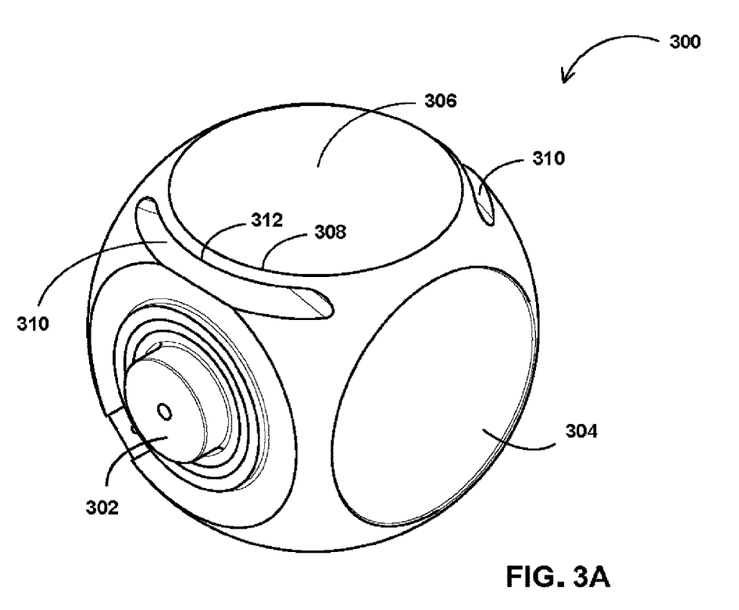
FIGS. 3A-3C are perspective and side profile views depicting a ball valve stopper configured in accordance with some embodiments.
Figure 3B:
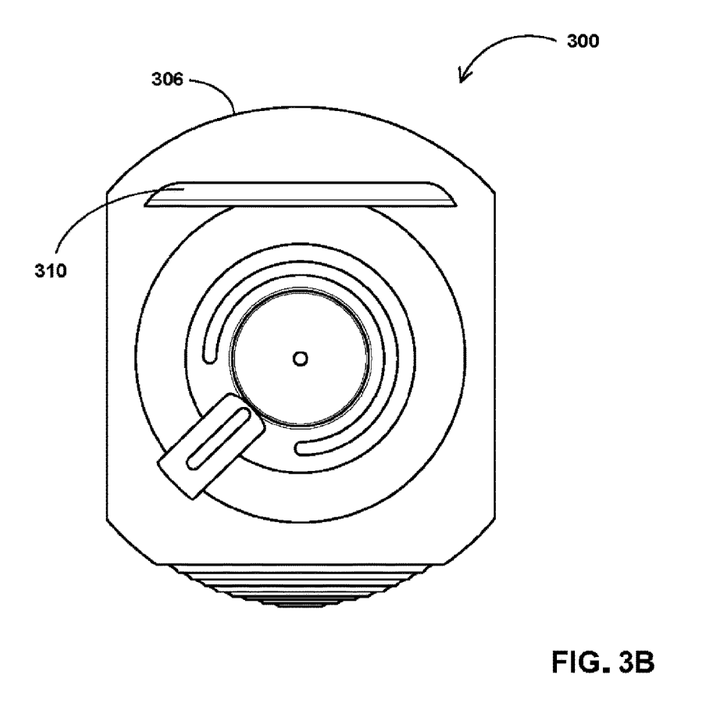
Figure 3C:
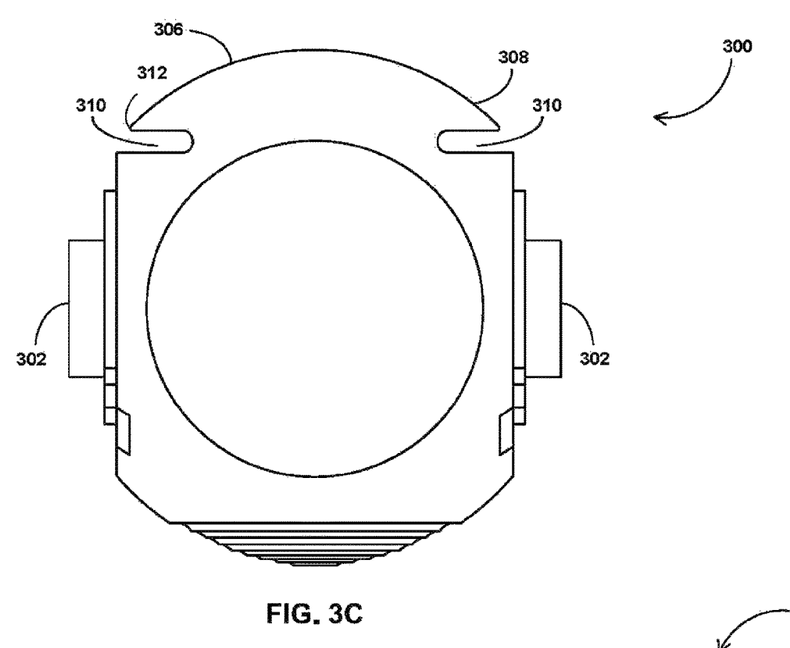
Figure 3D:
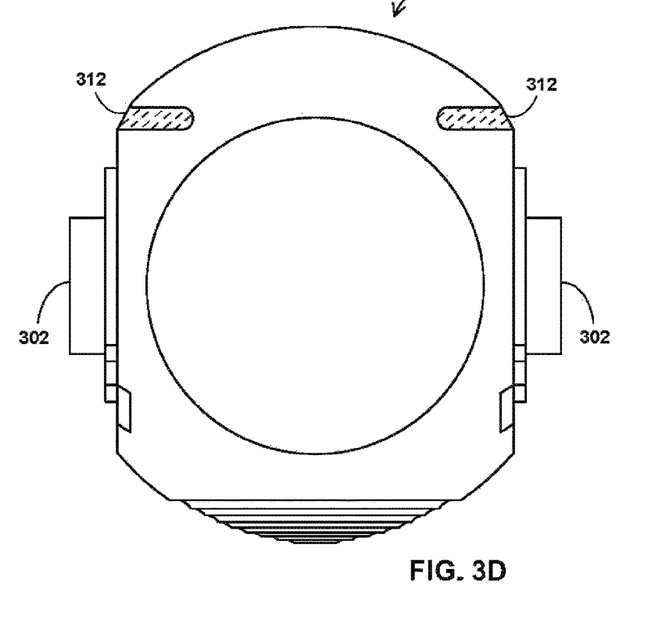
FIG. 3D is a side profile view illustrating a ball valve stopper configured in accordance with some embodiments.
Figure 3E:
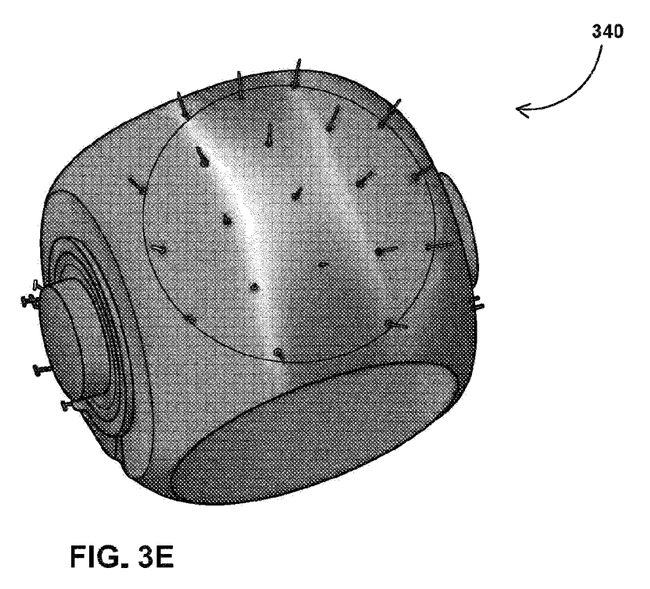
FIG. 3E is a perspective image with shaded coding depicting the deformation profile across a closed face of a conventional ball valve stopper.
Figure 3F:
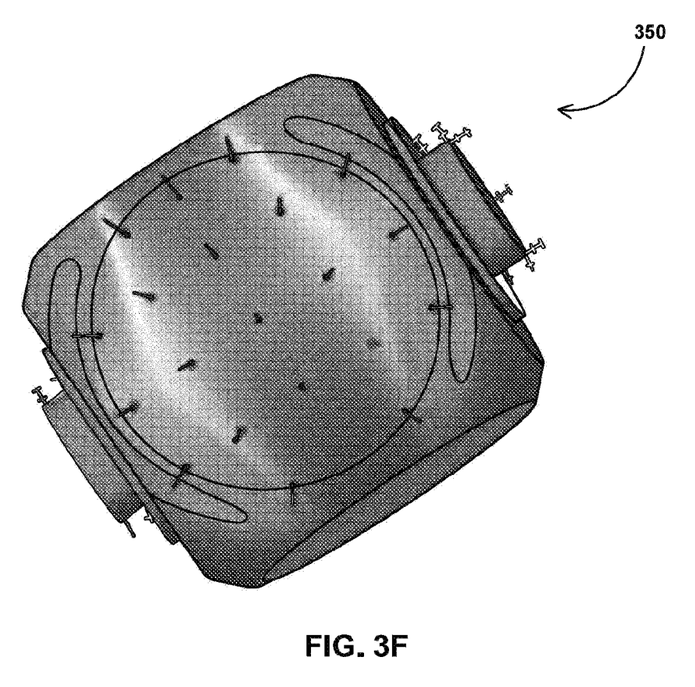
FIG. 3F is a perspective image with shaded coding illustrating the deformation profile across a closed face of a ball valve stopper configured in accordance with some embodiments.

The void channel volumes embodied by open channels 310 result in a more circularly uniform pressure resistance around the circular perimeter of annular sealing area 308. For example, FIG. 3E is a perspective image with shaded coding depicting the deformation profile across a closed face of a conventional ball valve stopper 340. As shown by the differential shade coding, the closed face is deformed in a non-uniform manner that is greatest along a rectangular area over the depicted flow port. In contrast, FIG. 3F is a perspective image with shaded coding illustrating the deformation profile across a closed face of a ball valve stopper 350 configured in accordance with one or more embodiments of the present disclosure. As shown by the differential shade coding, the pressure resistance balancing provided by a material discontinuity volume such as represented by open channels 310 results in closed face deformation that is substantially more circularly uniform. The difference in circular uniformity of the closed face deformation may translate to higher differences along an annular sealing area such as from 0.008"-0.010" for FIG. 3E and lower differences such as approximately 0.003" for FIG. 3F.

In some embodiments, the material discontinuity volume may comprise a cavity or channel that is not a void or space and instead contains a filler material that provides the pressure resistance offset/balance function while maintaining greater overall structural strength. For example, FIG. 3D is a side profile view illustrating ball valve stopper 300 configured to include closed or filled channels 312 disposed behind fluid seal area 306. In some embodiments, the material contained in channels 312 may be a metallic and/or elastomeric material having different properties in terms of reaction to an applied pressure that the material of which the body of ball valve stopper 300 is fabricated. For example, the material in channels 312 may comprise a metal, alloy, elastomeric, or polymer having a lower modulus of elasticity and/or a lower indentation hardness than the modulus of elasticity or indentation hardness of material of which the body of ball valve stopper 300 is fabricated, such as another metal, alloy, elastomeric or polymer of which the body of ball valve stopper 300 may be fabricated.

Figure 4:
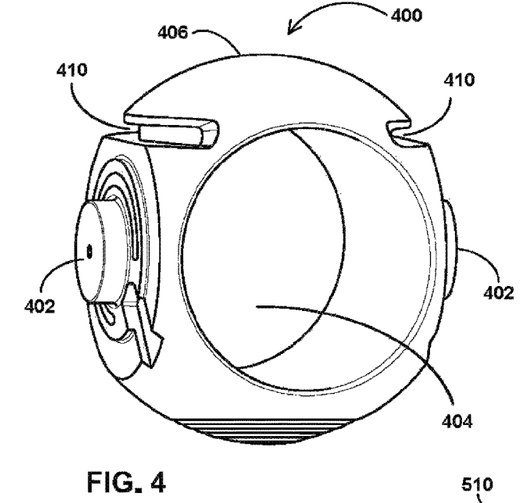
FIG. 4 is a perspective image depicting a ball valve stopper configured in accordance with some embodiments.
Figure 5:
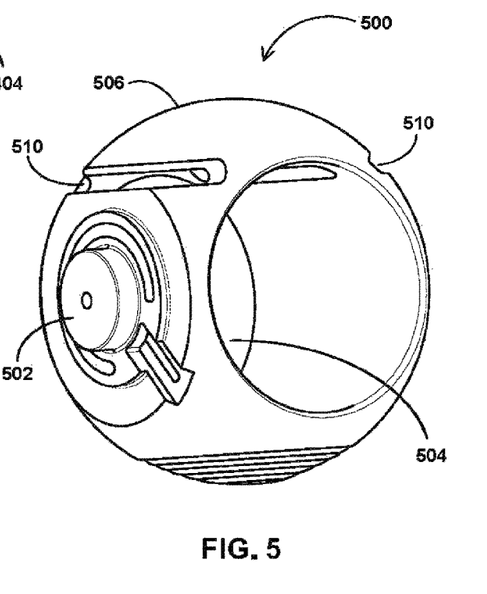
FIG. 5 is a perspective image illustrating a ball valve stopper configured in accordance with some embodiments.
Figure 6:
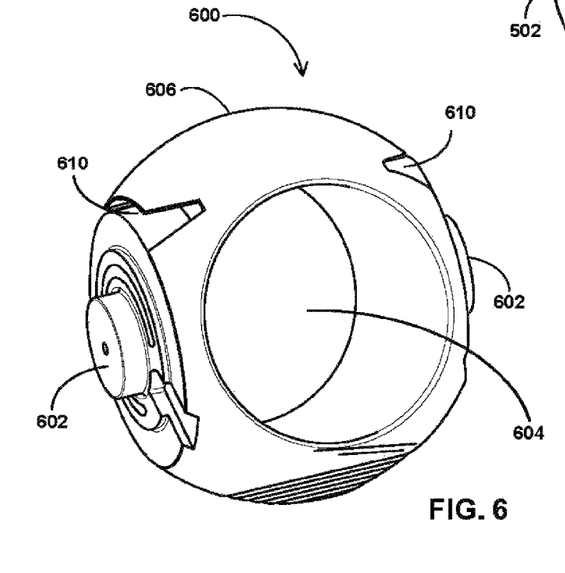
FIG. 6 is a perspective image depicting a ball valve stopper configured in accordance with some embodiments.

FIGS. 4-6 depict differently configured ball valve stoppers configured in accordance with some embodiments. FIG. 4 is a perspective view depicting a ball valve stopper 400 as including a material discontinuity volume in the form of a pair of open channels 410 that run substantially in parallel to a flow port 404. As shown, each of open channels 410 is positioned between a respective one of a pair of rotation support members 402 and at least a portion of a fluid seal area 406 of a closed face of ball valve stopper 400. In the depicted embodiment, open channels 410 are each straight line channels that vary in depth at various points based on the distance between an outside point of the channel (i.e., the outer circumferential point) and the centerline axis of flow port 404. In contrast to open channels 310, open channels 410 are formed using multiple material layers.

FIG. 5 is a perspective view depicting a ball valve stopper 500 as including a material discontinuity volume in the form of a pair of open channels 510 that run substantially in parallel to a flow port 504. As shown, each of open channels 510 is positioned between a respective one of a pair of rotation support members 502 and at least a portion of a fluid seal area 506 of a closed face. In the depicted embodiment, open channels 510 are each straight line channels that vary in depth at various points based on the distance between an outside point of the channel (i.e., the outer circumferential point) and the centerline axis of flow port 504. In contrast to open channels 310 and 410, open channels 510 extend through and perforate the inner surface of flow port 504.

FIG. 6 is a perspective view depicting a ball valve stopper 600 as including a material discontinuity volume in the form of a pair of open pockets 610 formed underneath an arched or otherwise curved portion of a fluid seal area 606 within a closed face and that are aligned with each of a pair of rotation support members 602. As shown, each of open pockets 610 is positioned between a respective one of rotation support members 602 and at least a portion of fluid seal area 606. In the depicted embodiment, and in contrast to the straight-line channels in FIGS. 3, 4, and 5, open pockets 610 are curved volumes that may vary in depth at various points based on the distance between an outside point of the channel (i.e., the outer circumferential point) and the centerline axis of flow port 604.

Figure 7A:
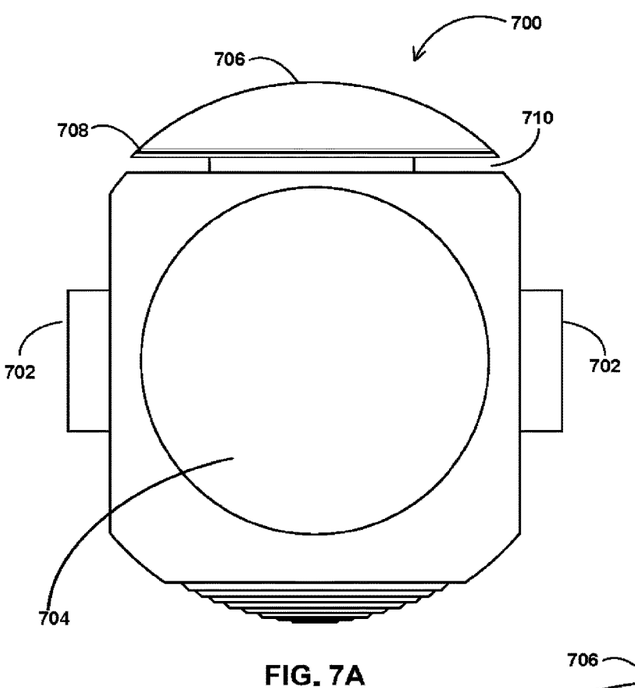
FIGS. 7A-7C are perspective and side images illustrating a ball valve stopper configured in accordance with some embodiments.
Figure 7B:
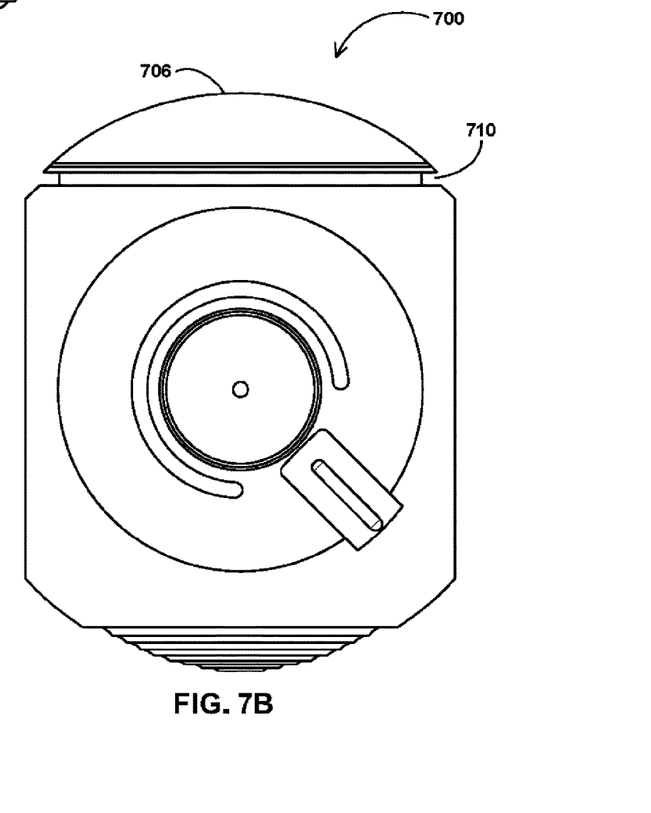
Figure 7C:
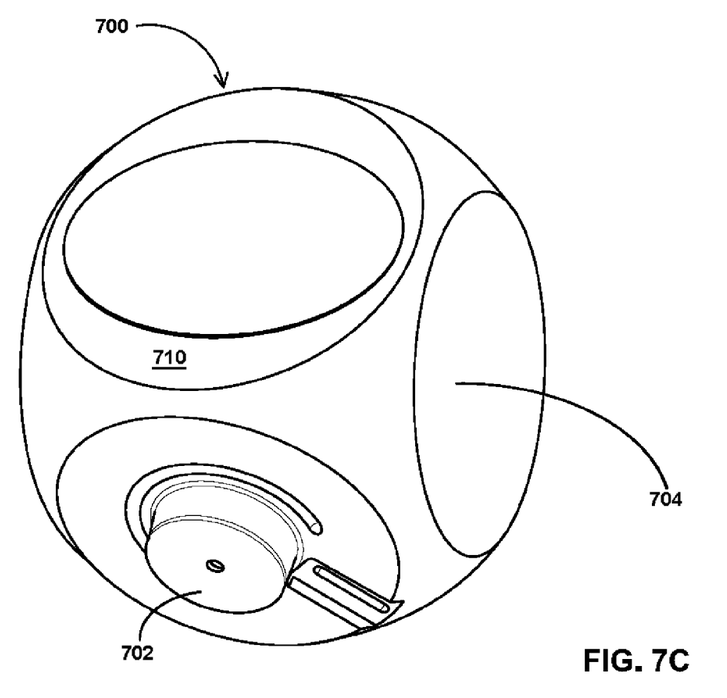
Figure 7D:
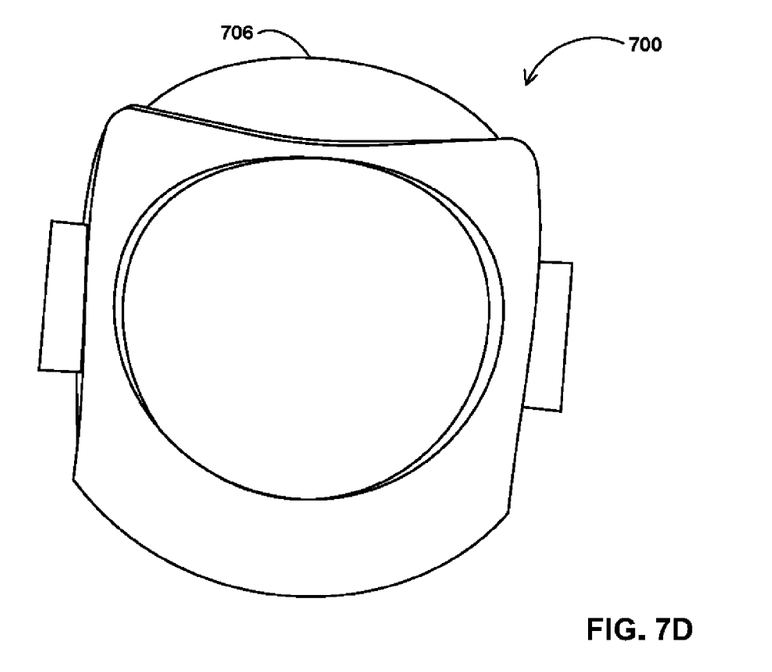
FIG. 7D is a side image depicting modified closed face contouring of a ball valve stopper following application of hydraulic pressure in accordance with some embodiments.

FIGS. 7A-7C are perspective and side images illustrating a ball valve stopper 700 configured in accordance with some embodiments. Ball valve stopper 700 comprises a spherical contoured metallic body that includes a rotation support member 702 that is aligned orthogonally with respect to a flow port 704. Orthogonally aligned with respect to flow port 704 and rotation support member 702 is a closed face that includes a fluid seal area 706 that is bounded by an annular sealing area 708 against which a valve seat is pushed in a ball valve assembly when the assembly is in the closed valve position. Ball valve stopper 700 further includes a material discontinuity volume in the form of a circumferential channel 710 that is disposed behind a portion of closed face 706 and circumferentially bounds fluid seal area 706 of a closed face of ball valve stopper 700. As shown particularly in the cutaway view of FIG. 7C, circumferential channel 710 is a slot channel having an outer circular and inner elliptical contour. Along the elliptical contour, the depth in the slot channel at each point on the circumference of fluid seal area 706 varies inversely with respect to a distance from the point to a centerline axis of flow port 704. FIG. 7D is a side image depicting fluid seal area 706 having been deformed in a circularly uniform manner following application of hydraulic pressure to fluid seal area 706 in accordance with some embodiments.

EXAMPLE EMBODIMENTS

Embodiment 1: a ball valve stopper comprising: a spherical contoured body comprising a substantially inelastic first material and having a flow port; a closed face of the spherical contoured body that is orthogonal with respect to the flow port and includes a fluid seal area; a rotation support member aligned orthogonally to the flow port and the fluid seal area; and a material discontinuity volume disposed behind the closed face of the spherical contoured body.

Embodiment 2: the ball valve stopper of Embodiment 1, wherein the material discontinuity volume is at least partially disposed behind the fluid seal area.

Embodiment 3: the ball valve stopper of Embodiments 1-2, wherein the material discontinuity volume includes a channel in the spherical contoured body that either comprises a void or contains a second material having a different modulus of elasticity than a modulus of elasticity of the first material.

Embodiment 4: the ball valve stopper of Embodiments 1-3, wherein the first material is metallic.

Embodiment 5: the ball valve stopper of Embodiments 1-4, wherein the second material has a lower modulus of elasticity than a modulus of elasticity of the first material.

Embodiment 6: the ball valve stopper of Embodiments 1-5, wherein the material discontinuity volume is disposed between at least a portion of the fluid seal area and the rotation support member.

Embodiment 7: the ball valve stopper of Embodiments 1-6, wherein the material discontinuity volume comprises a channel and wherein a cross-section area of the channel varies based on the proximity of the cross-section area to a centerline axis of the flow port.

Embodiment 8: the ball valve stopper of Embodiments 1-7, wherein the cross-section area of the channel varies inversely with respect to a distance between the cross-section area and the centerline axis of the flow port.

Embodiment 9: the ball valve stopper of Embodiments 1-8, wherein the material discontinuity volume comprises a slot channel disposed circumferentially around the fluid seal area.

Embodiment 10: the ball valve stopper of Embodiments 1-9, wherein a depth of the slot channel at each point on the circumference of the slot channel varies inversely with respect to a distance from the point to a centerline axis of the flow port.

Embodiment 11: the ball valve stopper of Embodiments 1-10, wherein said rotation support member comprises a diametrically opposing pair of trunnion support members, wherein the material discontinuity volume comprises a pair of linear channels each formed between a respective one of the trunnion support members and the closed face.

Embodiment 12: A ball valve assembly comprising: a valve stopper rotatable about a rotation axis and comprising a closed face that is orthogonally disposed with respect to a flow port through the valve stopper; a valve seat having an annular seating surface that contacts an annular sealing area on the closed face when the valve stopper is rotated to a valve closed position; and wherein the valve stopper includes a material discontinuity volume formed behind the closed face within at least a portion of a circular cross-section area of the valve stopper bounded by the annular sealing area.

Embodiment 13: the ball valve assembly of Embodiment 12, further comprising a rotation support member centrally aligned on the rotation axis, wherein the material discontinuity volume comprises a linear channel between the rotation axis and the annular sealing area.

Embodiment 14: the ball valve assembly of Embodiment 12, wherein the material discontinuity volume comprises a channel disposed circumferentially around a fluid seal area within the closed face and varies in cross-section area.

Embodiment 15: the ball valve assembly of Embodiments 12-14, wherein the channel comprises a void.

Embodiment 16: the ball valve assembly of Embodiments 12-14, wherein the valve stopper comprises a first metallic material, and wherein the channel contains a second material having a lower modulus of elasticity than the first metallic material.

Embodiment 17: the ball valve assembly of Embodiments 12-16, further comprising an actuator configured to press the valve seat in contact with the annular sealing area.

Embodiment 18: the ball valve assembly of Embodiments 12-17, further comprising a body housing a valve cavity disposed between an upstream flow port and a downstream flow port and within which said valve stopper rotates.

Embodiment 19: the ball valve assembly of Embodiments 12-18, wherein said valve seat and the annular sealing area are disposed within the downstream flow port when the valve stopper is rotated to the valve closed position.

Embodiment 20: the ball valve assembly of Embodiments 12-19, wherein the material discontinuity volume comprises a slot channel disposed circumferentially around a fluid seal area within the closed face, and wherein a depth of the slot channel at each point on the circumference of the slot channel varies inversely with respect to a distance from the point to a centerline axis of the flow port.

What is claimed is:

1. A ball valve stopper comprising:
    a spherical contoured body comprising a substantially inelastic first material and having a flow port;
    a closed face of the spherical contoured body that is orthogonal with respect to the flow port and includes a fluid seal area;
    a rotation support member aligned orthogonally to the flow port and the fluid seal area; and
    a material discontinuity volume disposed behind the closed face of the spherical contoured body, wherein the material discontinuity volume comprises a channel, and wherein a cross-section area of the channel varies inversely with respect to a distance between the cross-section area and a centerline axis of the flow port.

2. The ball valve stopper of claim 1, wherein the material discontinuity volume is at least partially disposed behind the fluid seal area.

3. The ball valve stopper of claim 1, wherein the material discontinuity volume includes a channel in the spherical contoured body that either comprises a void or contains a second material having a different modulus of elasticity than a modulus of elasticity of the first material.

4. The ball valve stopper of claim 3, wherein the first material is metallic.

5. The ball valve stopper of claim 4, wherein the second material has a lower modulus of elasticity than a modulus of elasticity of the first material.

6. The ball valve stopper of claim 1, wherein the material discontinuity volume is disposed between at least a portion of the fluid seal area and the rotation support member.

7. The ball valve stopper of claim 1, wherein the material discontinuity volume comprises a slot channel disposed circumferentially around the fluid seal area.

8. The ball valve stopper of claim 7, wherein a depth of the slot channel at each point on the circumference of the slot channel varies inversely with respect to a distance from the point to the centerline axis of the flow port.

9. The ball valve stopper of claim 1, wherein said rotation support member comprises a diametrically opposing pair of trunnion support members, wherein the material discontinuity volume comprises a pair of linear channels each formed between a respective one of the trunnion support members and the closed face.

10. The ball valve stopper of claim 1, wherein the cross-sectional area of the channel varies equally in either axial direction along the centerline from a center point of the centerline.

11. A ball valve assembly comprising:
    a valve stopper rotatable about a rotation axis and comprising a closed face that is orthogonally disposed with respect to a flow port through the valve stopper;
    a valve seat having an annular seating surface that contacts an annular sealing area on the closed face when the valve stopper is rotated to a valve closed position; and
    wherein the valve stopper includes a material discontinuity volume formed behind the closed face within at least a portion of a circular cross-section area of the valve stopper bounded by the annular sealing area, wherein the material discontinuity volume comprises a slot channel disposed circumferentially around a fluid seal within the closed face, and wherein a depth of the slot channel at each point on the circumference of the slot channel varies inversely with respect to a distance from the point to a centerline axis of the flow port.

12. The ball valve assembly of claim 11, further comprising a rotation support member centrally aligned on the rotation axis, wherein the material discontinuity volume comprises a linear channel between the rotation axis and the annular sealing area.

13. The ball valve assembly of claim 11, wherein the material discontinuity volume comprises a channel disposed circumferentially around the fluid seal within the closed face and varies in cross-section area.

14. The ball valve assembly of claim 13, wherein the channel comprises a void.

15. The ball valve assembly of claim 13, wherein the valve stopper comprises a first metallic material, and wherein the channel contains a second material having a lower modulus of elasticity than the first metallic material.

16. The ball valve assembly of claim 11, further comprising an actuator configured to press the valve seat in contact with the annular sealing area.

17. The ball valve assembly of claim 16, further comprising a body housing a valve cavity disposed between an upstream flow port and a downstream flow port and within which said valve stopper rotates.

18. The ball valve assembly of claim 17, wherein said valve seat and the annular sealing area are disposed within the downstream flow port when the valve stopper is rotated to the valve closed position.

19. The ball valve assembly of claim 11, wherein the depth of the slot channel varies equally in either axial direction along the centerline from the center point of the centerline.

* * * * *